United States Patent

Esteghlal et al.

[11] Patent Number: 6,161,428
[45] Date of Patent: Dec. 19, 2000

[54] METHOD AND APPARATUS FOR EVALUATING THE CONVERSION CAPABILITY OF A CATALYTIC CONVERTER

[75] Inventors: Gholamabas Esteghlal, Darmstadt; Andreas Blumenstock, Ludwigsburg, both of Germany

[73] Assignee: Robert Bosch GmbH, Stuttgart, Germany

[21] Appl. No.: 09/240,987

[22] Filed: Feb. 1, 1999

[30] Foreign Application Priority Data

Jan. 31, 1998 [DE] Germany .................... 198 03 828

[51] Int. Cl.$^7$ ............................ G01M 15/00; F01N 9/00
[52] U.S. Cl. ........................ 73/118.1; 73/23.31; 60/277
[58] Field of Search ................... 73/116, 117.2, 73/117.3, 118.1, 23.31, 23.32; 60/272, 273, 277

[56] References Cited

U.S. PATENT DOCUMENTS 5,267,472 12/1993 Schneider et al. .
5,842,339 12/1998 Bush et al. .............................. 73/118.1
5,852,930 12/1998 Yasui et al. ................................. 60/276
5,862,661 1/1999 Zhang et al. ............................ 73/118.1

FOREIGN PATENT DOCUMENTS 0478133 4/1992 European Pat. Off. .
0743433 11/1996 European Pat. Off. .

*Primary Examiner*—Eric S. McCall
*Attorney, Agent, or Firm*—Walter Ottesen

[57] ABSTRACT

The invention is directed to a method for checking an exhaust-gas catalytic converter for an internal combustion engine wherein the oxygen content of the exhaust gas is determined rearward of the catalytic converter and the mean oxygen content of the exhaust gas forward of the catalytic converter is changed in a direction which leads away from the oxygen content previously determined rearward of the catalytic converter. The resulting change of the oxygen fill level of the catalytic converter is determined which results from the change of the average oxygen content. This change is compared to a predetermined limit value. A fault announcement is not made when the predetermined limit value is exceeded before the oxygen content of the exhaust gas rearward of the catalytic converter changes. An arrangement for carrying out the method of the invention is also disclosed.

7 Claims, 4 Drawing Sheets

METHOD AND APPARATUS FOR EVALUATING THE CONVERSION CAPABILITY OF A CATALYTIC CONVERTER

FIELD OF THE INVENTION

The invention relates to the evaluation of catalytic converters which are used to convert toxic substances in the exhaust gas of an internal combustion engine.

BACKGROUND OF THE INVENTION

Because of statutory requirements, components of a motor vehicle which are relevant to the emission of toxic substances must be monitored with on-board equipment during operation. For example, faults are intended to be discovered and displayed which permit the toxic substance emissions to rise over the permitted values by a factor of 1.5. The possible fault sources include, inter alia, the complete or partial loss of the conversion capability of a catalytic converter for toxic substances. It is known that the conversion capability for toxic substances is associated with the capability of storing oxygen. Accordingly, a conclusion can be drawn as to the conversion capability from the oxygen storage capability.

In this context, U.S. Pat. No. 5,267,472 discloses to set, under defined conditions, the oxygen quantity introduced into the catalytic converter into relationship with the oxygen quantity flowing out therefrom and to draw a conclusion as to the oxygen storage capability of the catalytic converter therefrom. For this purpose, the oxygen content of the exhaust gas is detected forward and rearward of the catalytic converter and multiplied by the air mass flow through the engine or by the exhaust-gas mass flow through the catalytic converter and then the products are integrated. The integral values are an index for the oxygen quantities which flow to the catalytic converter and which flow out therefrom. The difference of the integral values supplies the change of the degree of oxygen charge of the catalytic converter in the integration time frame. In the known method, it is ensured that, during the diagnosis, a complete charge of the catalytic converter with oxygen and a subsequent complete discharge thereof and vice versa takes place.

Complete charges and/or discharges of the catalytic converter cause reactions of the rearward exhaust-gas probe and toxic-substance peaks downstream of the catalytic converter. A reaction of the rearward probe shows that the catalytic converter is overloaded with oxygen or indicates an oxygen deficiency. Toxic substances rearward of the catalytic converter then also occur. For example, oxygen deficiency in the exhaust gas forward of the catalytic converter is associated with the occurrence of hydrocarbons and carbon monoxide. As long as the catalytic converter can still give off oxygen, these toxic substances are converted in the catalytic converter to water and carbon dioxide with the participation of oxygen. A catalytic converter emptied of oxygen cannot make this conversion. The above-mentioned toxic substances, which occur in a reaction of the rearward probe, are therefore released to the ambient.

SUMMARY OF THE INVENTION

In view of this background, it is the object of the invention to provide a method and an arrangement for evaluating the converting capability of a catalytic converter wherein a reaction of the rearward probe is not absolutely necessary. Stated otherwise, the frequency with which exhaust-gas peaks are triggered by the diagnosis should be reduced.

The method of the invention is for checking an exhaust-gas catalytic converter for an internal combustion engine. The method includes the steps of: determining the oxygen content of the exhaust gas rearward of the catalytic converter; changing the mean oxygen content of the exhaust gas forward of the catalytic converter in a direction which leads away from the previously determined oxygen content rearward of the catalytic converter; determining the change of the oxygen fill level of the catalytic converter which results from the change of the mean oxygen content and comparing the change of the oxygen fill level to a predetermined limit value; and, inhibiting a fault announcement when the predetermined limit value is exceeded before the oxygen content changes rearward of the catalytic converter.

The invention is based on changing the oxygen fill level of the catalytic converter by an amount which corresponds approximately to the oxygen storage capacity of a limit catalytic converter. A limit catalytic converter is a hypothetical catalytic converter which just satisfies the statutory requirements. An oxygen storage capability Y0 is assigned to this limit catalytic converter and this storage capability Y0 can be determined for the particular catalytic converter embodiment in test stand investigations.

The change of the oxygen fill level can be obtained via a change of the mixture composition with which the internal combustion engine is operated. If the extent of the change reaches the oxygen storage capacity of the limit catalytic converter without the exhaust-gas probe, which is mounted rearward of the catalytic converter, reacting to the change of the mixture composition, then the oxygen storage capability is per force greater than that of the limit catalytic converter. The condition precedent here is that the catalytic converter is not completely filled with oxygen before a change to a lean mixture and, for a change to a rich mixture, the catalytic converter is not completely emptied of oxygen. In this case, the catalytic converter can be evaluated as operational without causing toxic-substance emissions rearward of the catalytic converter in connection with the diagnosis.

The time frame in which the oxygen fill level of the catalytic converter is changed by a defined amount marks a first phase. If a reaction of the rearward exhaust-gas probe occurs during this first phase, this does not mean that the catalytic converter is defective. Such changes can occur because the fill level of the catalytic converter at the start of the test is not definitively known. The start of the test is the start of the change of the oxygen fill level. If, for example, the catalytic converter is by chance already relatively empty at the test start and is then emptied further, a conclusion as to the operability cannot be concluded from the probe reaction alone. However, the probe reaction marks a defined fill level of the catalytic converter. In this case, the reaction of the rearward probe triggers the interruption of the first phase and the start of the second phase. In the second test phase, an opposite mixture change and therefore an opposite change of the oxygen fill level occurs. This change takes place, in turn, by the defined amount, which is orientated to the storage capacity of the limit catalytic converter. If a further reaction of the rearward probe takes place during this change, then this shows a catalytic converter which is no longer operational. In contrast, no further reaction of the rearward probe occurs for an operationally sound catalytic converter and therefore no further unwanted increase of the toxic-substance emissions which can be attributed to the performance of the test.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
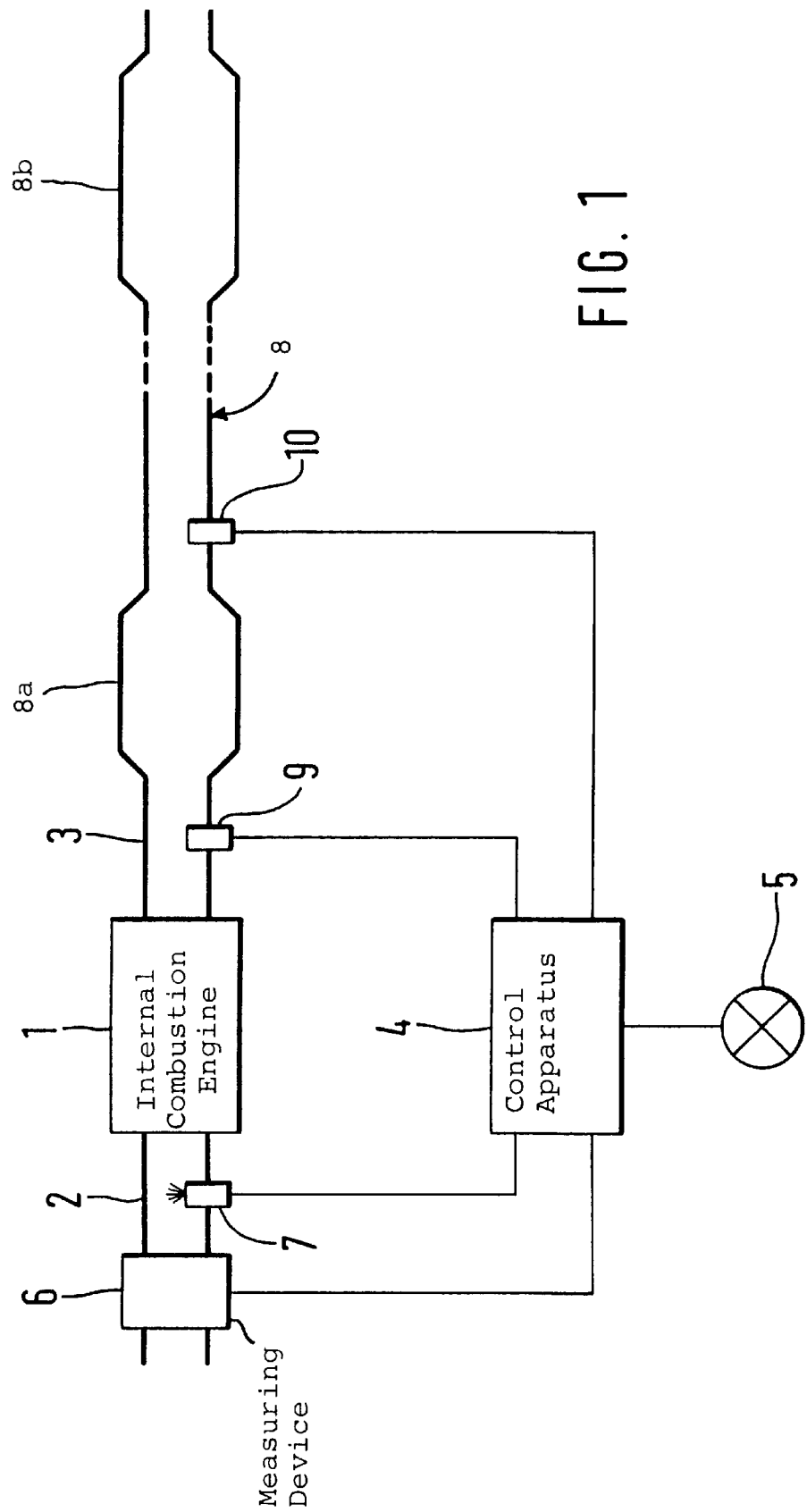
FIG. 1 is a schematic showing the elements which coact in the method and arrangement according to the invention for checking an exhaust-gas catalytic converter for an internal combustion engine.

Reference numeral 1 in FIG. 1 identifies an internal combustion engine having an intake manifold 2, an exhaust-gas system 3, a control apparatus 4 and a device 5 for displaying or storing malfunctions. Reference numeral 6 identifies a device for detecting the quantity of intake air. Reference numeral 7 represents a fuel-metering device and reference numeral 8 identifies a catalytic converter volume subdivided into two portions (8a, 8b). The volume 8 is provided with exhaust-gas probes 9 and 10 which are separated from each other by at least a portion 8a of the catalytic converter volume 8.

Figure 2:
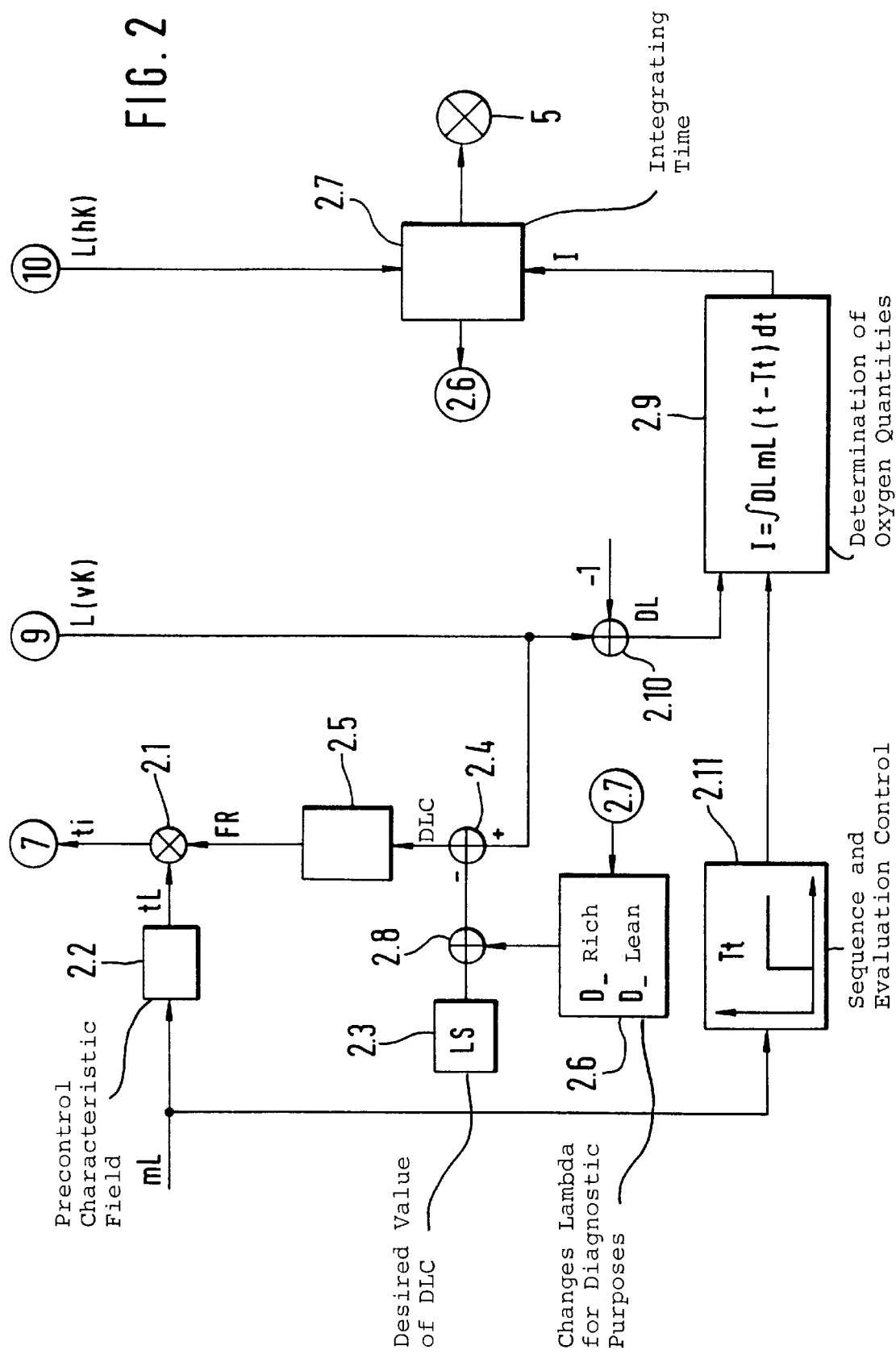
FIG. 2 is a function block diagram for explaining the variable s in combination with the invention.

The coaction of the individual components of FIG. 1 is explained with respect to the function block diagram of FIG. 2.

The fuel-metering signal ti for driving the fuel-metering device 7 is formed as the product of a base value tL and a control factor FR in block 2.1. The base value tL is, for example, determined by accessing a precontrol characteristic field 2.2 which is addressed by the intake air quantity mL and, if required, further variables such as the engine rpm. The lambda value of the mixture combusted in the engine 1 is detected by the exhaust-gas probe 9. In FIG. 2, this value is identified as L(vK) (lambda forward of the catalytic converter). The control deviation DLC is formed in block 2.4 from the actual value and a desired value made available by block 2.3. And, in a manner known per se, the control deviation DLC (delta lambda control) is processed in the controller 2.5 to the control factor FR. The block 2.6 serves to change lambda for diagnostic purposes.

Block 2.6 is controlled by a sequence control and evaluation block 2.7. For clearing the oxygen from the catalytic converter, block 2.6 outputs a value D_Rich which is negative and which is additively coupled to the lambda desired value in block 2.8. The lambda desired value supplied to block 2.4 is thereby reduced which leads to a richer mixture and oxygen deficiency and hydrocarbons as well as carbon monoxide in the exhaust gas forward of the catalytic converter. The oxygen, which is stored in the catalytic converter, is consumed for converting HC and CO. In this way, and for a rich mixture, an emptying of the catalytic converter of stored oxygen takes place. Correspondingly, and for a lean mixture, the catalytic converter is filled with oxygen, that is, for an oxygen excess in the exhaust gas. Oxygen excess can be generated by logically coupling the lambda desired value to a positive value D_Lean.

As an alternative to the desired value shift, the mixture changes can be generated also via an asymmetrical change of the control parameters such as P component and I component or by delay times when switching over the direction of integration in block 2.5.

In block 2.9, the oxygen quantities, which flow into and out of the catalytic converter, are determined. This determination is made from a quantity DL which represents the relative oxygen excess or deficiency referred to lambda=1 and the value of the inducted air-mass flow mL which flows through the engine and the catalytic converter. The value mL can advantageously be weighted with the oxygen content of the inducted air. The quantity DL is formed in block 2.10 as difference of the lambda actual value L(vK) from the value 1. The value 1 corresponds to a stoichiometric mixture ratio. An oxygen excess is present in the exhaust gas when DL is positive and oxygen deficiency is present in the exhaust gas when DL is negative. Block 2.11 delays the transmission of the value mL to block 2.9 by the dead time Tt. This time is the total time between the device 6 in the intake manifold forward of the engine and the catalytic converter 8 or the exhaust-gas sensor 9 behind the engine. Block 2.11 improves the precision of the oxygen balancing in block 2.9 especially in transition operating states in which the inducted air quantity fluctuates greatly.

Block 2.9 determines the oxygen quantity, for example, by integrating the product of DL and mL(t−Tt). The integration time is pregiven by means 2.7. The oxygen fill level of the catalytic converter can be modeled from the integral value under specific assumptions and conditions. The signal of the rearward probe 1 serves to check the modeled oxygen fill level.

The invention is based upon changing the oxygen fill level of the catalytic converter in a defined manner. For example, a good catalytic converter, which contains no oxygen at the test start, must be able to buffer an oxygen quantity Y0 which a limit catalytic converter can take up. For a good catalytic converter, the signal of the rearward exhaust-gas probe must therefore indicate an oxygen deficiency at the start and end of the test phase, that is, after an input of an oxygen quantity Y0 in the catalytic converter. If this is not the case, the catalytic converter is defective and a fault lamp 5 can, for example, be switched on.

Figure 3:
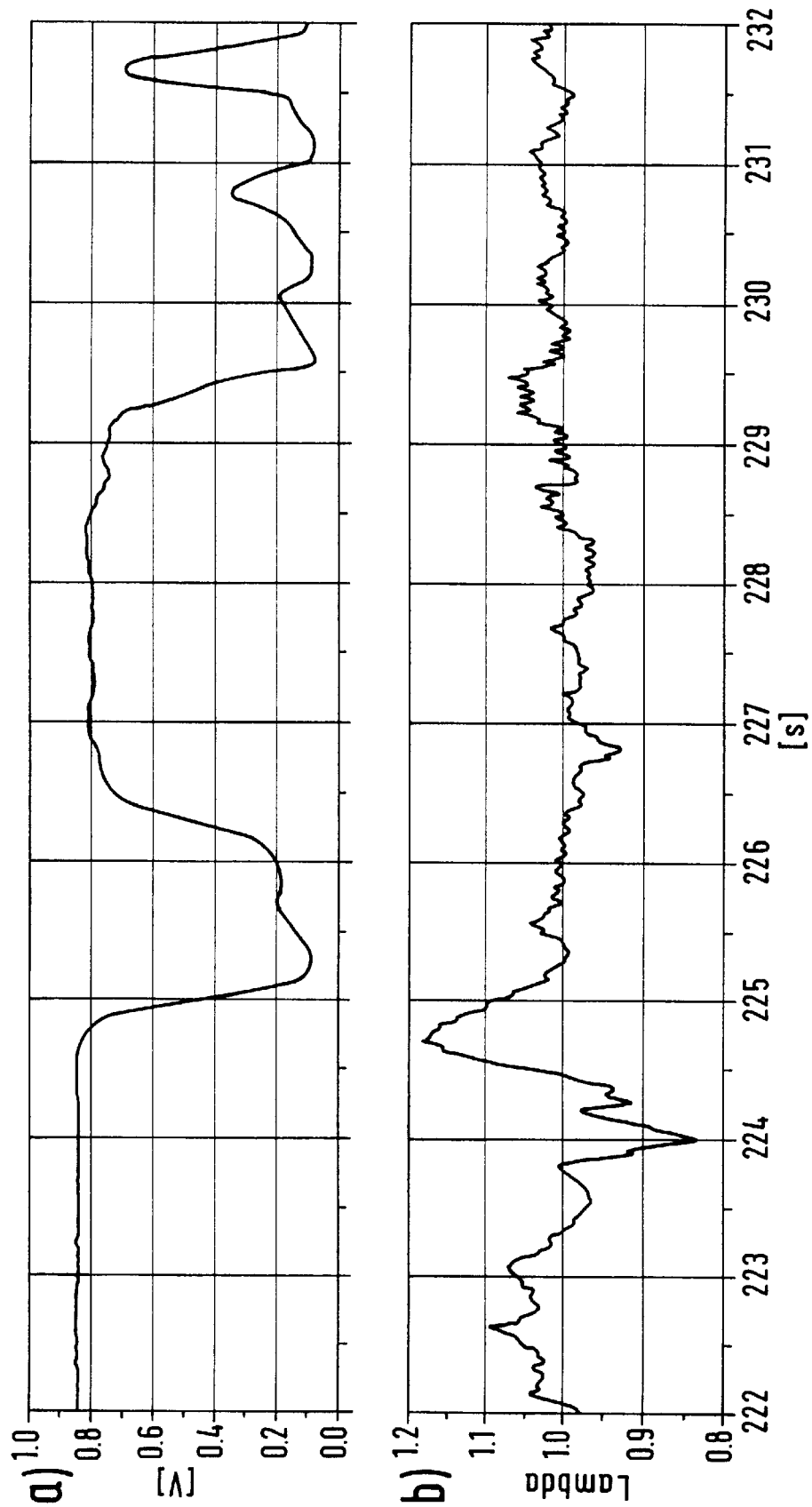
FIGS. 3a and 3b show signal traces as they occur in an embodiment of the invention; and, FIG. 4 shows an embodiment of the method of the invention in the context of a flowchart.

FIGS. 3a and 3b shows a method sequence based on signal traces with the method sequence being shown by the function blocks of FIG. 2.

FIG. 3a shows the time-dependent trace of the signal of the rearward exhaust-gas probe 10. The high signal level corresponds to oxygen deficiency and the low signal level corresponds to oxygen excess.

FIG. 3b shows the trace of lambda forward of the catalytic converter. Here, the high signal level corresponds to an oxygen excess and the low signal level corresponds to an oxygen deficiency.

At time point t=224 seconds, the rearward exhaust-gas probe indicates an oxygen deficiency. From this follows that the catalytic converter is at least not entirely filled with oxygen. More precise information as to the oxygen fill level is not provided at this location. The downward peak in the signal of the forward probe indicates an enrichment of a large extent. This can, for example, can be generated by displacing the lambda control desired value by the offset D_Rich or D_Lean in blocks 2.6 and 2.8 of FIG. 2.

The oxygen output from the catalytic converter is computed in block 2.9 simultaneously with the generation of the shift in the rich direction. The shift in the rich direction is carried out by block 2.7 until the amount of the integral I exceeds the value Y0. The time point of exceeding the value Y0 is reached when the sum of the positive Y0 and the negative I is less than 0 because I increases in magnitude with increasing time. The oxygen fill level of the catalytic converter is therefore reduced by the value Y0. Thereafter, block 2.7 impresses a lean offset T_Lean onto the control desired value via block 2.6. As a consequence, the catalytic converter is filled with oxygen which is indicated by the peak in the signal of the forward probe between t=224.5 and approximately t=225.3. The integral value I, which is formed in this phase, corresponds to the oxygen input into the catalytic converter. The oxygen charge is maintained until the integral value, which is now positive, exceeds the value Y0 or the rearward exhaust-gas probe reacts to the oxygen charge.

In the embodiment shown, the rearward exhaust-gas probe reacts before the value Y0 is reached. As a consequence, the test catalytic converter is poorer than a limit catalytic converter, which is indicated by a switch-on of the fault lamp 5. The switching-on of the fault lamp can, if required, take place only after statistical reliability is ensured with several tests. An operational catalytic converter should be able to take up at least as much oxygen as the limit catalytic converter. The value Y0 of the oxygen storage capability of a limit catalytic converter was removed from the catalytic converter in the previous rich phase. For this reason, a catalytic converter, which is still good, should be able to buffer this input of the quantity Y0 without the rearward probe indicating an oxygen excess.

Figure 4:
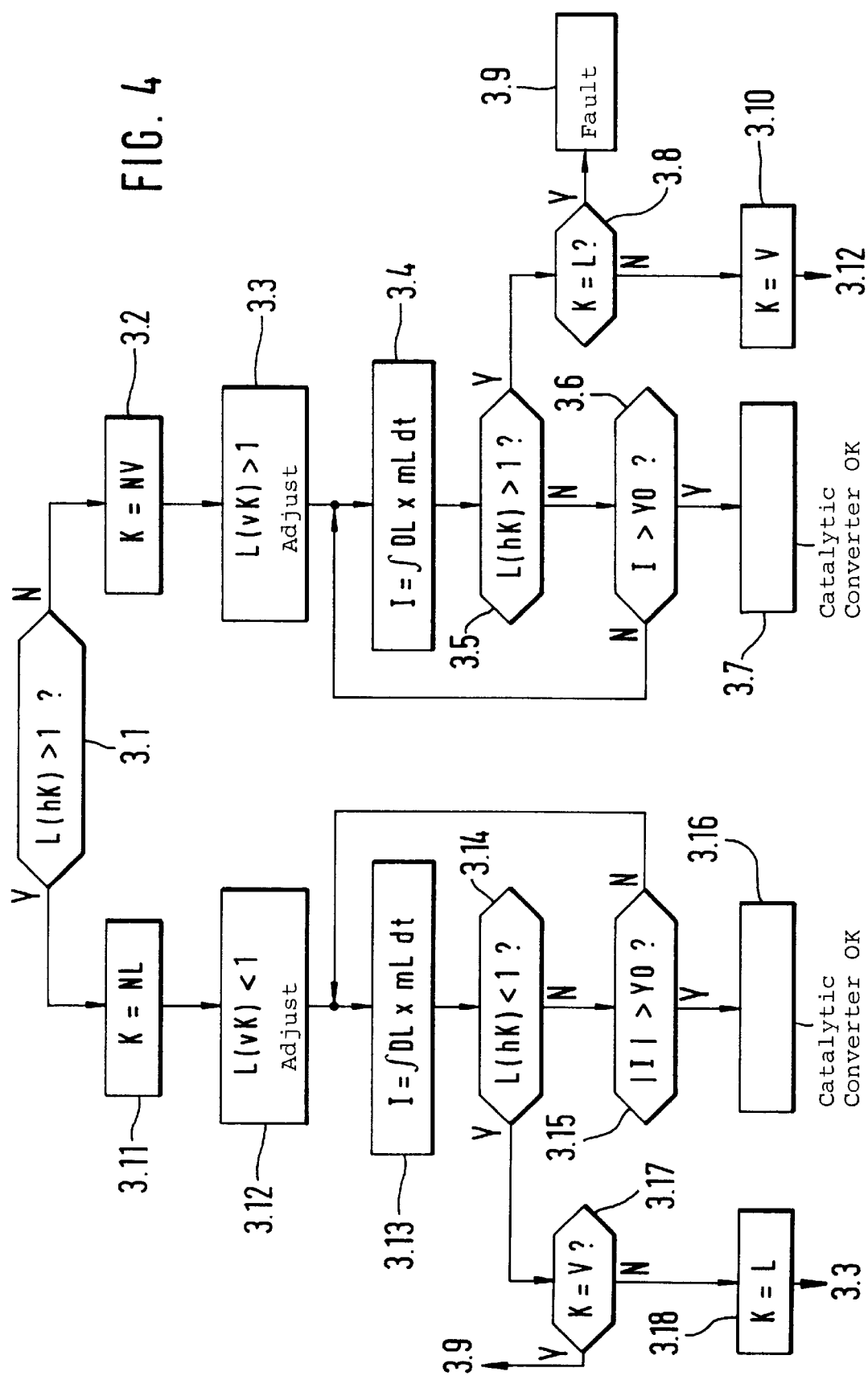

FIG. 4 shows an embodiment of the method of the invention in the context of a flowchart.

After the start of the diagnostic method, a check takes place in step 3.1 as to whether an oxygen excess (L(hK)>1) or an oxygen deficiency (L(hK)<1) is present rearward of the catalytic converter. From L(hK)<1, it follows that the catalytic converter is not completely filled with oxygen. Thereupon, in step 3.2, the variable K has a value NV (K=NV, which indicates that the catalytic converter is not full). This means that, when entering an oxygen quantity, a change of the signal of the rearward probe is possible from a value <1 to a value >1. This also applies when the catalytic converter is definitively emptied of oxygen (K=L). For test purposes, a lean lambda value >1 is adjusted in step 3.3.

Step 3.4 serves to detect the oxygen quantity flowing into the catalytic converter by forming the above-described integral I. Step 3.5 checks whether the rearward probe reacts to the oxygen entry. As long as this probe does not react, an inquiry 3.6 follows wherein the integral value is compared to a threshold value Y0. As long as I<Y0 and the rearward probe does not react, the loop comprising the steps 3.4, 3.5 and 3.6 is repeatedly run through. If the program leaves the loop via step 3.6 to step 3.7, the catalytic converter is OK. In this case, the oxygen quantity Y0 (which marks the limit between good and poor catalytic converters) was entered into the catalytic converter without the occurrence of a reaction of the rearward probe.

If, in contrast, the program leaves the loop via step 3.5, then two cases are distinguished in the following step 3.8. If the catalytic converter was empty at test start (K=L), its storage capability is less than that of a limit catalytic converter. In this case, the display and/or storage of a fault takes place via step 3.9. If in contrast, the catalytic converter was not full (K=NV) at test start, then its oxygen storage capability cannot be definitively evaluated. However, the probe reaction in this case shows that the catalytic converter is completely filled with oxygen. Correspondingly, step 3.10 sets K=V and the sequence branches into the left portion of the flowchart. The left portion defines, to an extent, the mirror-image of the right portion. Here, lambda <1, that is, oxygen deficiency is adjusted for test purposes in step 3.12. The remaining steps correspond substantially to those of the right branch or its mirror-image reversal. At the start, the catalytic converter is not empty (K=NL, step 3.11) or full (K=V, step 3.12). Then, oxygen deficiency is set and the integral I (step 3.13) is formed. The value I is here negative. When I becomes greater in magnitude than Y0, the catalytic converter is OK (steps 3.15, 3.16). Otherwise, two cases must be here distinguished. When the probe reacts before I is greater than Y0 and the catalytic converter at test start was full (K=V), its oxygen storage capability is less than that of the limit catalytic converter. In this case, a fault announcement takes place via the steps 3.14, 3.17 and 3.9. If, in contrast, the catalytic converter at test start was simply not empty, then it is now definitively empty and K=L (step 3.18) is set via step 3.17 and there is a branching into the rich portion.

It is understood that the foregoing description is that of the preferred embodiments of the invention and that various changes and modifications may be made thereto without departing from the spirit and scope of the invention as defined in the appended claims.

What is claimed is:

1. A method for checking an exhaust-gas catalytic converter for an internal combustion engine wherein an exhaust gas is generated having an oxygen content and said oxygen content having a mean value forward of said catalytic converter, the catalytic converter having an oxygen fill level which changes during operation of said engine, the method comprising the steps of:

utilizing a rearward exhaust-gas probe to determine a value of the oxygen content of the exhaust gas rearward of said catalytic converter;

in a first phase, changing the mean value of said oxygen content of the exhaust gas forward of said catalytic converter in a first direction which moves away from said value of said oxygen content determined rearward of said catalytic converter;

determining the change of the oxygen fill level of said catalytic converter which results from the change of said mean value of said oxygen content and continuing said change of said oxygen fill level until:

(a) said oxygen fill level exceeds a value (YO) which corresponds to an oxygen storage capacity of a catalytic converter which just still satisfies statutory requirements; or, (b) said rearward exhaust-gas probe reacts to the change of said oxygen fill level;

causing a fault announcement to take place only when said rearward exhaust-gas probe reacts to said change of said oxygen fill level in said first phase; and, in a second phase, causing a further reaction of said rearward exhaust-gas probe to take place when there is a change of said mean value of said oxygen content forward of said catalytic converter in a second direction opposite to said first direction before said change of said oxygen fill level exceeds said value (YO).

2. The method of claim 1, comprising the further step of determining the change of the oxygen fill level of said catalytic converter from a deviation (DL) of said oxygen content in the exhaust gas forward of said catalytic converter from a value applicable for stoichiometric conditions and an air quantity (mL) inducted by said engine.

3. The method of claim 2, comprising the further steps of:

determining the deviation (DL) of the oxygen content in the exhaust gas forward of said catalytic converter from the value applicable for stoichiometric conditions at time point (t);

detecting the air quantity (mL) inducted by said engine;

forming the product of said deviation (DL) and said air quantity (mL); and, integrating said product over time at a time point (t−tL) earlier than said time point (t).

4. The method of claim 3, wherein the time difference (tT=t−(t−tT)) corresponds to the time elapsed for the air and fuel mixed therewith to travel from the location where said air intake quantity (mL) is detected forward of said engine to the location whereat the oxygen content of the exhaust gas forward of said catalytic converter is determined.

5. The method of claim 3, comprising the further step of considering the oxygen content of the inducted air when making the determination of the change of the oxygen fill level of said catalytic converter from said deviation (DL) of the oxygen content of the exhaust gas forward of said catalytic converter from the value applicable for stoichiometric conditions and the air quantity (mL) inducted by said engine.

6. The method of claim 1, wherein a predetermined limit value corresponds to the oxygen storage capacity of a catalytic converter which still just satisfies the statutory requirements as to the conversion of toxic substances contained in said exhaust gas.

7. An arrangement for checking an exhaust-gas catalytic converter for an internal combustion engine wherein an exhaust gas is generated having an oxygen content and said oxygen content having a mean value forward of said catalytic converter, the catalytic converter having an oxygen fill level which changes during operation of said engine, the arrangement comprising:

a rearward exhaust-gas probe for determining a value of the oxygen content of the exhaust gas rearward of said catalytic converter;

means for changing, in a first phase, the mean value of said oxygen content of the exhaust gas forward of said catalytic converter in a first direction which moves away from said value of said oxygen content determined rearward of said catalytic converter;

means for determining the change of the oxygen fill level of said catalytic converter which results from the change of said mean value of said oxygen content;

means for continuing said change of said oxygen fill level until:

(a) said oxygen fill level exceeds a value (YO) which corresponds to an oxygen storage capacity of a catalytic converter which just still satisfies statutory requirements; or, (b) said rearward exhaust-gas probe reacts to the change of said oxygen fill level;

means for causing a fault announcement to take place only when said rearward exhaust-gas probe reacts to said change of said oxygen fill level in said first phase; and, means for causing, in a second phase, a further reaction of said rearward exhaust-gas probe to take place when there is a change of said mean value of said oxygen content forward of said catalytic converter in a second direction opposite to said first direction before said change of said oxygen fill level exceeds said value (YO).

* * * * *